UNITED STATES PATENT OFFICE.

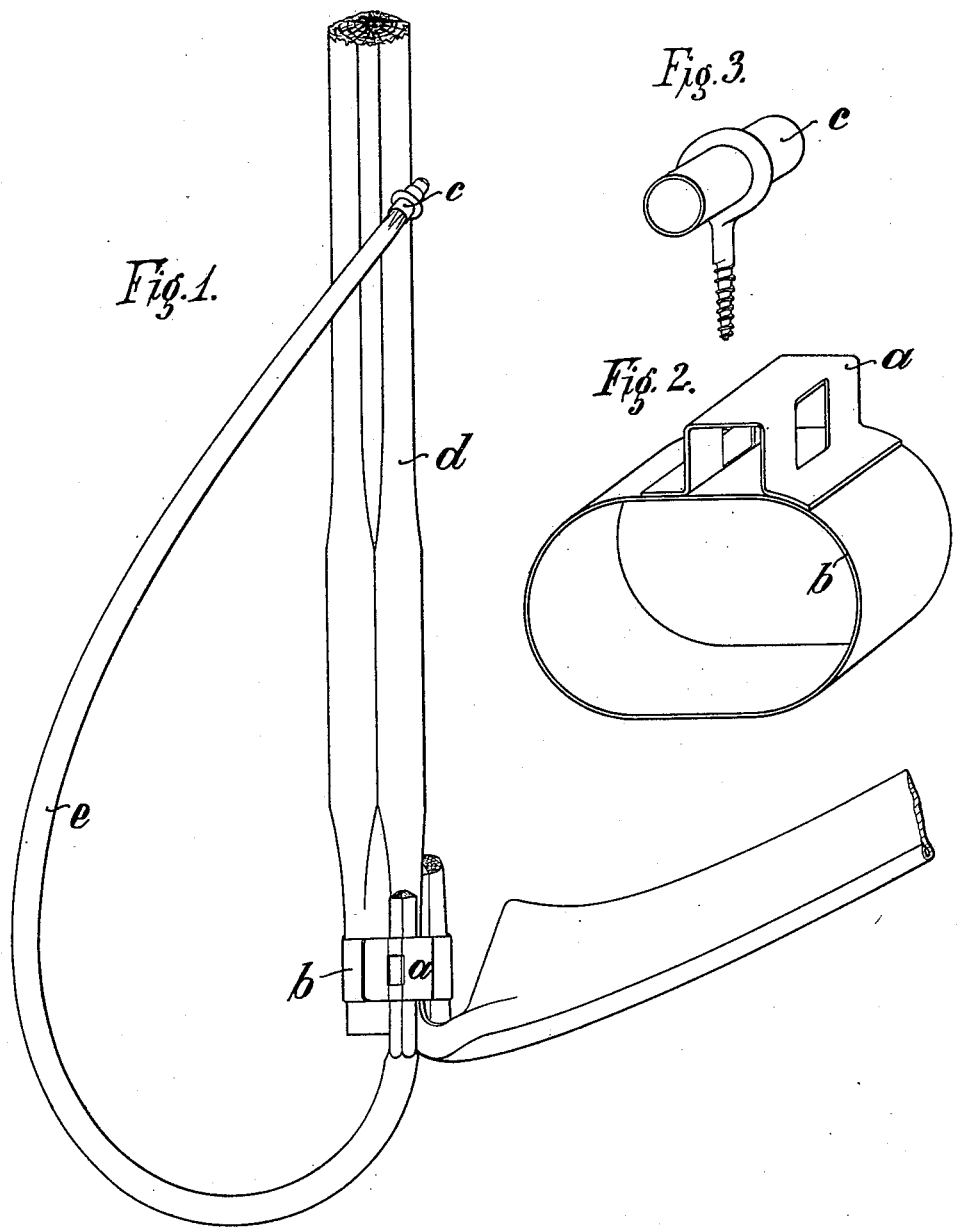

DETLEF SCHÜMANN, OF WILLINGRADE, NEAR BOOSTEDT, GERMANY.

GUARD-FASTENING DEVICE FOR SCYTHES.

SPECIFICATION forming part of Letters Patent No. 673,479, dated May 7, 1901.

Application filed September 10, 1900. Serial No. 29,521. (No model.)

*To all whom it may concern:*

Be it known that I, DETLEF SCHÜMANN, a subject of the King of Prussia, Emperor of Germany, and a resident of Willingrade, near Boostedt, Holstein, Germany, have invented certain new and useful Improvements in Guard - Fastening Devices for Scythes, of which the following is a specification.

In mowing corn or grain with a scythe the latter should be provided with a guard to catch the stalks or blades as they are cut and so as to break their fall. In other words, the guard is provided to prevent the stalks from falling too suddenly and quickly to the ground, whereby the grains of corn or wheat, &c., are liable to drop out of the ears and are lost. Numerous ways and means have been provided to fasten these guards to the stock or handle, but as they usually fasten the guard rigidly to the handle, so that they could not easily be changed or replaced, I have provided a fastening device which permits of the easy removal or securing of the guard—usually a hazelnut or willow stick—in place.

In the accompanying drawings I have illustrated the device, in which—

Figure 1 is a perspective view showing a scythe with a guard held at two places onto the handle of the scythe. Fig. 2 is a perspective view of a ring for attaching the scythe to a handle by means of a wedge and having a socket in which one end of the guard is held, and Fig. 3 is a perspective view of a screw-eye with socket adapted to be screwed into the handle to engage the other end of the guard.

The improved device, which is designed for fastening a guard temporarily or exchangeably to the scythe, consists of a socket $a$, fixed to the scythe-fastening ring $b$, Figs. 1 and 2, and a socket $c$, screwed into the handle $d$ of the scythe, Figs. 1 and 3, or secured thereto in any other suitable manner. The guard $e$, made of flexible wood, such as cane or the like, is inserted into the socket $a$ from below and bent upward, its upper end being introduced into the socket $c$. This socket may be cylindrical or of any other desired shape, while the socket $a$ on the scythe-fastening ring $b$ is appropriately made of prismatic shape in order to preclude the turning or twisting of the guard $e$.

What I claim is—

A guard-fastening device for scythes comprising a scythe-fastening ring, a socket secured thereto to hold one end of a flexible wooden stick, and a screw-eye in the scythe-handle to hold the other end of the stick forming the guard, substantially as described.

In witness whereof I have hereunto set my hand in presence of two witnesses.

DETLEF SCHÜMANN.

Witnesses:
 AUG. HEINR. SCHÜMANN,
 HEINRICH THUN.